United States Patent [19]

Yamakage et al.

[11] 4,400,118
[45] Aug. 23, 1983

[54] MACHINE TOOL WITH BORE DIAMETER MEASURING APPARATUS AND TOOL POSITION COMPENSATING APPARATUS

[75] Inventors: Tetsuro Yamakage, Anjo; Takao Yoneda, Toyoake; Kohsei Imamura, Kariya, all of Japan

[73] Assignee: Toyoda Koki Kabushiki Kaisha, Kariya, Japan

[21] Appl. No.: 281,869

[22] Filed: Jul. 9, 1981

[30] Foreign Application Priority Data

Sep. 24, 1980 [JP] Japan ............................ 55-132728

[51] Int. Cl.³ .................. B23B 39/08; B23D 39/24; G05B 19/18
[52] U.S. Cl. ........................ 408/3; 318/571; 364/474; 408/12; 408/13; 408/168; 409/127
[58] Field of Search .................. 408/10, 11, 12, 13, 408/168, 3, 153, 161, 149; 82/1.2, 2 E; 364/474, 194; 409/127, 128; 318/470, 561, 571

[56] References Cited

U.S. PATENT DOCUMENTS

| | | | |
|---|---|---|---|
| 3,279,285 | 10/1966 | Ivins | 408/3 |
| 3,715,167 | 2/1973 | Ollearo | 408/149 |
| 3,740,160 | 6/1973 | Kimura et al. | 408/13 |
| 3,740,161 | 6/1973 | Milewski | 408/12 |
| 4,009,968 | 3/1977 | Vandenkieboom | 408/12 |
| 4,206,392 | 6/1980 | Shimajiri et al. | 318/571 |
| 4,281,385 | 7/1981 | Nakaso et al. | 364/474 |
| 4,345,192 | 8/1982 | Kohzai et al. | 364/474 |

FOREIGN PATENT DOCUMENTS 54-85492  7/1979  Japan .

Primary Examiner—Robert E. Garrett
Assistant Examiner—Tom Kline
Attorney, Agent, or Firm—Oblon, Fisher, Spivak, McClelland & Maier

[57] ABSTRACT

A machine tool including a tool holder supporting a boring tool and receivable in a tool spindle. A device is provided in the tool holder for adjusting the radial position of the boring tool by utilizing rotation of the tool spindle. A contact detecting head with a known predetermined diameter is secured to the tool holder in co-axial relationship therewith. A contact detecting device detects the contact between a workpiece bore and the contact detecting head. A bore diameter measuring device measures a diameter of the workpiece bore by causing relative movement between the contact detecting head and the workpiece from a first position to a second position wherein at each of the first and second positions the contact detecting head contacts the workpiece, along a path passing through the center of the workpiece bore. The tool spindle is rotated in response to the measuring device to adjust the radial position of the boring tool.

4 Claims, 4 Drawing Figures

MACHINE TOOL WITH BORE DIAMETER MEASURING APPARATUS AND TOOL POSITION COMPENSATING APPARATUS

BACKGROUND OF THE INVENTION

1. Field of the Invention

The present invention relates to a machine tool with a bore diameter measuring apparatus and a tool position compensating apparatus.

2. Description of the Prior Art

In a conventional machine tool, in order to measure a machined bore of a workpiece mounted on the machine tool, a measuring device, provided with a displaceable feeler and a displacement detector, such as a differential transformer, for detecting a displacement amount of the feeder, is inserted into a tool spindle of the machine tool to be moved into engagement with the machined bore. In order to output the measured signal, the measuring device is also provided with conductors which are connected through a connector to an external control circuit. Accordingly, such measuring device cannot be formed integrally with a boring tool which is rotated for boring operations. As a consequence, in order to measure the machined bore, the measuring device has to be inserted into the tool spindle through the aid of an automatic tool change device, and after measurement of the machined bore, the measuring device is exchanged for the boring tool by means of the automatic tool change device. The radial position of the boring tool is then adjusted based upon the measured value for a finish boring operation. In particular, in case where a workpiece is first trial bored and then finished by the boring tool being adjusted based upon the measured result of the workpiece bore machined at trial, the automatic tool change operation thus has to be performed twice, which is time-consuming. Furthermore, misalignment between the boring tool during trial boring and during finish boring is caused as a result of the automatic tool change operation, which effects the accuracy of the finished bore.

SUMMARY OF THE INVENTION

It is therefore an object of the present invention to provide an improved machine tool capable of measuring a workpiece bore and adjusting a radial position of a boring tool based upon the measured result with the boring tool being inserted into a tool spindle without intervention of an automatic tool change operation.

Another object of the present invention is to provide an improved machine tool of the character set forth above, wherein a tool holder with the boring tool is provided with a co-axial contact detecting head for measuring the workpiece bore and an adjusting apparatus for adjusting the radial position of the boring tool by utilizing rotation of the tool spindle.

Briefly, according to the present invention, these and other objects are achieved by providing a machine tool as mentioned in greater detail below. A work table is mounted on a machine body for mounting thereon a workpiece formed with a bore to be machined. A spindle head is mounted on the machine body and rotatably supports a tool spindle. A motor is drivingly connected to the tool spindle for rotating the tool spindle. A servomotor is provided for effecting relative movement between the work table and the tool spindle. A feed control mechanism is connected to the servomotor for controlling the servomotor in accordance with feed pulses and axis designation signals.

A boring tool is supported on a tool holder receivable in the tool spindle and a mechanism is provided in the tool holder for adjusting a radial position of the boring tool by utilizing rotation of the tool spindle. A contact detecting head with a predetermined diameter is secured to the tool holder in co-axial relationship therewith, while a mechanism is also electrically connected to the contact detecting head for detecting contact between the workpiece and the contact detecting head. A bore diameter measuring mechanism is connected between the contact detecting mechanism and the feed control mechanism for applying feed pulses and axis designation signals to the feed control mechanism so as to move the tool spindle relative to the workpiece from one position to another position at each of which the contact detecting head contacts the workpiece, along a path passing through the center of the workpiece bore, to thereby measure the diameter of the workpiece bore. A motor control circuit is connected to the motor for controlling the motor. The motor control circuit is responsive to the measuring mechanism for rotating the tool spindle to adjust the radial position of the boring tool.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
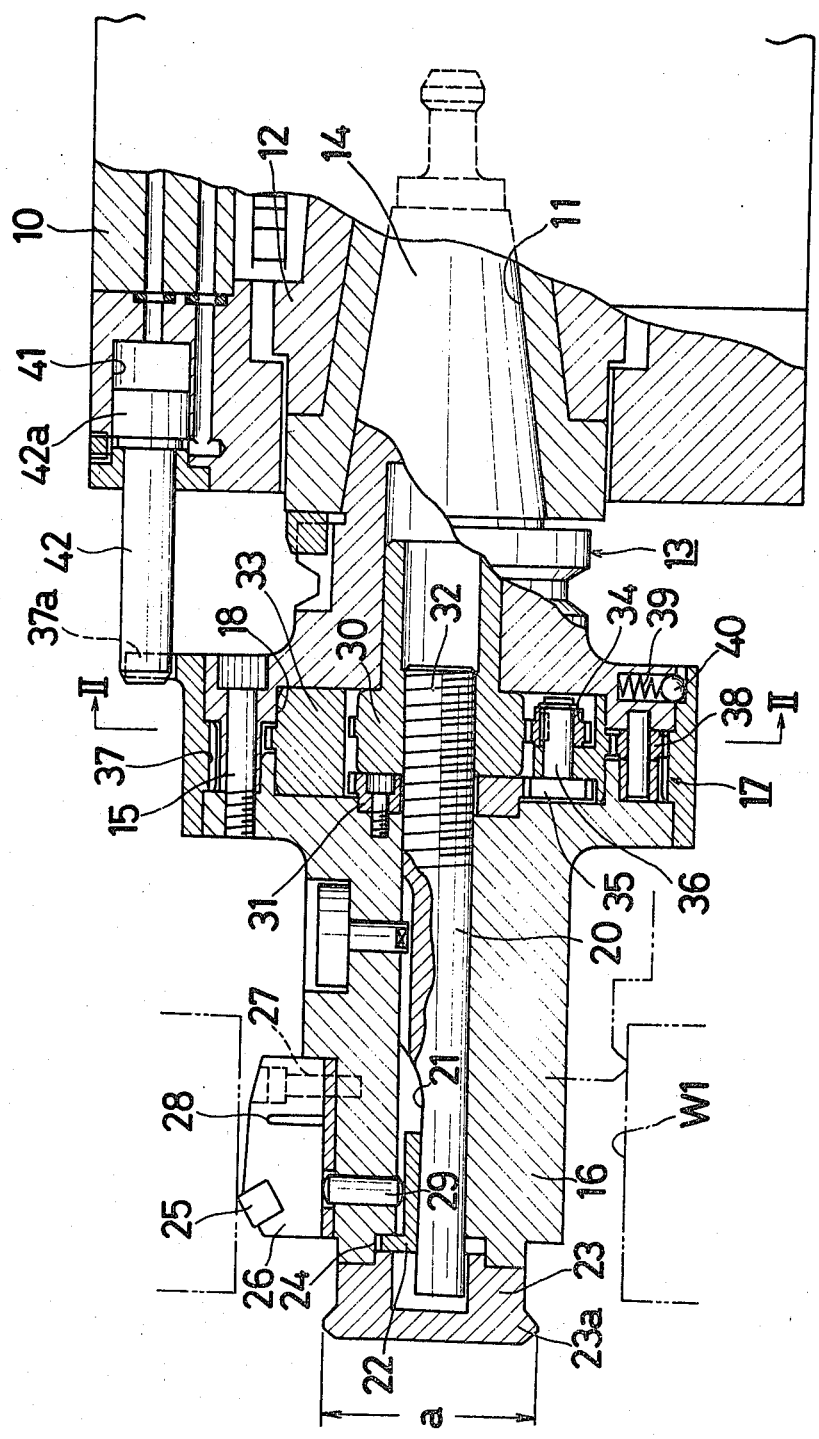
FIG. 1 is a sectional view of a tool holder incorporating a tool position compensating apparatus used in a machine tool according to the present invention.

Referring now to the drawings, and more particularly to FIG. 1, there is shown a spindle head 10 of a numerically controlled machine tool with an automatic tool change function. A tool spindle 12, having a tapered bore 11 at its front end, is rotatably supported in spindle head 10. Tool spindle 12 is rotated by a drive motor and is stopped at a predetermined angular position during tool change operation. Furthermore, every rotation of tool spindle 12 is detected by an proximity switch (not shown) during tool position compensating operation. It is to be noted here that the machine tool has a function of measuring a machined bore by utilizing a contact detecting device, which is described hereinafter.

Reference numeral 13 denotes a tool holder to be used in the machine tool and incorporating a tool position compensating mechanism. Tool holder 13 includes a shank 14 to be inserted into tapered bore 11 of spindle 12 and a cylindrical tool mounting shell 16 secured to shank 14 in co-axial alignment therewith through bolts 15. A recess is formed at a contact portion between shank 14 and shell 16 to receive a reduction gear mechanism 17, which is described hereinbelow.

A screw shaft 20 is non-rotatably but axially slidably received within shell 16 in co-axial relationship therewith. Screw shaft 20 is formed at the front end thereof with a cam surface 21 which is sloped to ascend as it goes toward the front end of screw shaft 20. A slide piece 22 is slidably engaged on cam surface 21 and is received in a groove 24, formed between shell 16 and a contact detecting head 23 secured to the front end of shell 16 in co-axial alignment therewith for measurement of a machined bore, in such a manner as to be movable only in a radial direction.

Shell 16 is formed at its external front portion with a tool mounting seat, on which one end of a cutting tool 26 having a cutting blade 25 at its other end is fixed by means of a bolt 27. Cutting tool 26 is formed at its mid portion with a slot 28 to facilitate outward flexing or bending of cutting blade 25. A pin 29 extends through mounting shell 16 in a radial direction thereof, and engages at one end thereof with slide piece 22 and at on opposite ends thereof with the back of cutting blade 25 of cutting tool 26. Accordingly, when screw shaft 20 is moved in the axial direction, slide piece 22 is moved in the radial direction through a wedging action of cam surface 21, whereby cutting tool 26 is flexed or bent in the radial direction through pin 29 to adjust the position of cutting blade 25.

Within recess 18 formed at the contact portion between shank 14 and shell 16, a rotary gear 30 rotatably supported by shank 14 and a stationary gear 31 secured to shell 16 are received in juxtaposed relationship and in coaxial alignment with the axis of shank 14. Rotary gear 30 is threadably engaged with a thread portion 32 formed at the rear end of screw shaft 20. Within recess 18, there is also received a ring-shaped transmission gear 33 which is rotatable about the axis of tool holder 13 and encloses rotary gear 30 and stationary gear 31. Transmission gear 33 rotatably supports a shaft 36 on which are secured a pair of pinion gears 34 and 35 engaged with rotary gear 30 and stationary gear 31, respectively. It is noted here that the number of teeth of stationary gear 31 and pinion 35 are respectively set to be $(N5-1)$ and $(N6+1)$, where N5 and N6 are tooth numbers of rotary gear 30 and pinion 34, respectively. Accordingly, a reduction gear ratio of rotary gear 30 to transmission gear 33 is made larger.

A ring-shaped internal gear 37 is rotatably supported on the external peripheries of shank 14 and shell 16. Rotatably supported by shank 14 is a planet gear 38 which is engaged with both of internal gear 37 and transmission gear 33. Internal gear 37 is formed with a V-shaped groove into which a steel ball 40 is disposed by means of a compression spring 39 disposed between shank 14 and ball 40. Accordingly, internal gear 37 is normally prevented from rotation relative to shank 14 and shell 16 during cutting operations.

Figure 2:
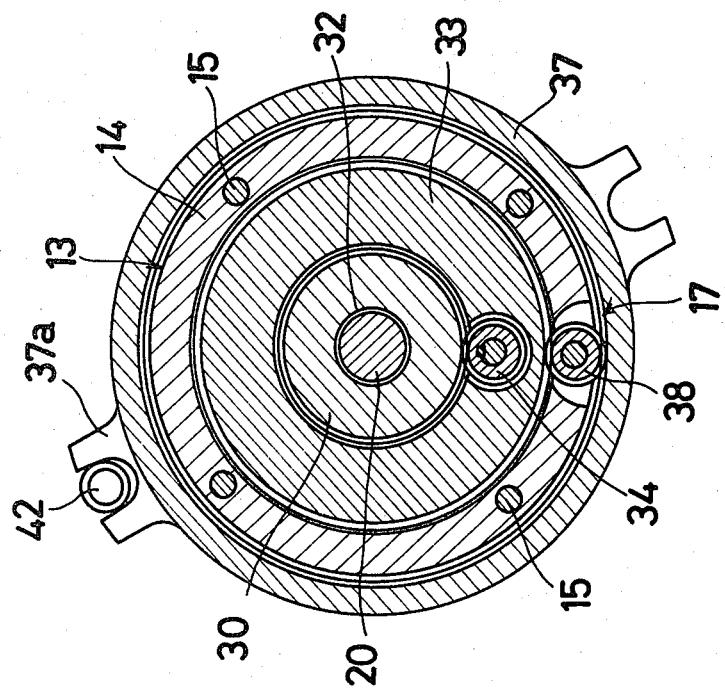
FIG. 2 is a sectional view taken along line II—II in FIG. 1.

As shown in FIG. 2, internal gear 37 has formed on its external periphery a pair of forked members 37a, one of which is engageable with a piston rod 42 of a piston 42a slidably received in a cylinder 41 formed in spindle head 10. When piston rod 42 is engaged with forked member 37a at the tool position compensating operation, internal gear 37 is fixed relative to spindle head 10 and relative rotation is allowed between internal gear 37 and shank 14.

Contact detecting head 23 is made of an electrically conductive material and formed with a flange portion 23a, whose external surface is cylindrical with a narrow width and has a predetermined diameter a. The external surface of flange portion 23a is not limited to bearing cylindrical, but may be formed in a spherical shape.

In the operation of tool position compensation in the above-described tool holder 13, said tool holder is inserted by the automatic tool change device into tapered bore 11 of tool spindle 12 to be stopped at a predetermined angular position. Cylinder 41 is actuated to advance piston rod 42 into engagement with forked member 37a of internal gear 37 to thereby fix internal gear 37 relative to spindle head 10. Under these conditions, spindle 12 together with tool holder 13 is rotated by the drive motor at a low speed. When tool holder 13 is rotated relative to internal gear 37, transmission gear 33 is rotated relative to tool holder 13 through planet gear 38 in the same direction as tool holder 13. Rotation of transmission gear 33 causes the pinion gear 35 to rotate about stationary gear 31, whereby rotary gear 30 is rotated relative to tool holder 13 through pinion 34.

Assuming that the tooth numbers of internal gear 37, transmission gear 33, stationary gear 31, pinion gear 35, rotary gear 30 and pinion gear 34 are designated as N1, N2, N3, N4, N5 and N6, respectively, the rotational amount $\theta$ of the rotary gear 30 per single rotation of the spindle 12 is represented as follows:

$$\theta = N1/N2(N3.N6/N4.N5 - 1)$$

Accordingly, rotation of spindle 12 is transmitted to rotary gear 30 with a large reduction gear ratio.

Rotation of rotary gear 30 relative to tool holder 13 causes screw shaft 20 to move in the rightward direction, as viewed in FIG. 1, whereby slide piece 22 is moved radially outwardly through the wedging action of the cam surface 21. Radial movement of slide piece 22 is transmitted through pin 29 to cutting tool 26 to thereby adjust the position of cutting blade 25 in the radial direction. In this manner, the radial position of cutting blade 25 of cutting tool 26 is adjusted through a unit amount per single rotation of the spindle 12.

Figure 3:
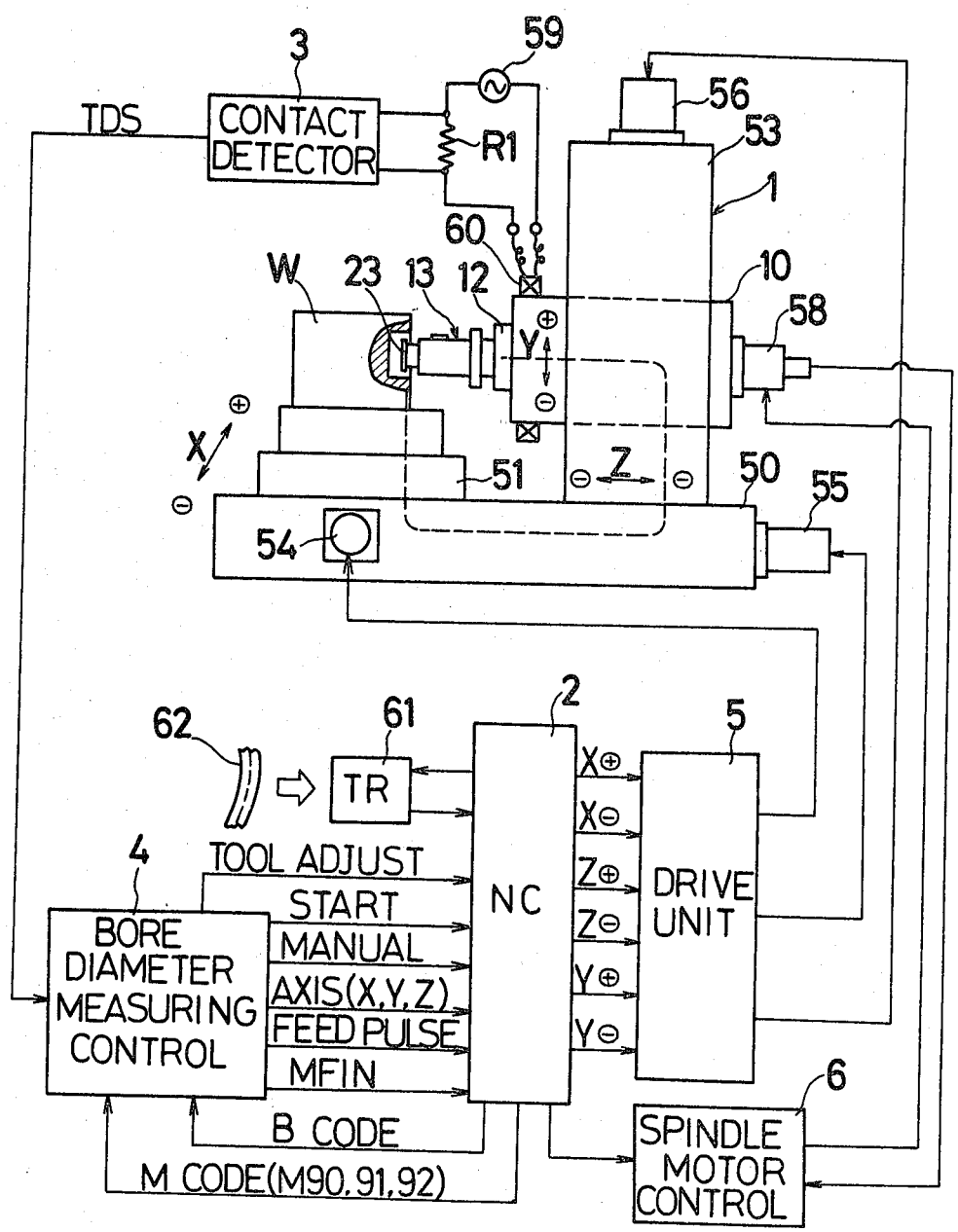
FIG. 3 is a schematic illustration of the machine tool with a bore diameter measuring apparatus for measuring a machined bore.

Construction of the machine tool with a bore diameter measuring function is described hereunder with reference to FIG. 3. The machine tool includes a machine body 1, a numerical control device 2, a contact detecting circuit 3 and a control device 4 for measurement of a machined bore.

Reference numeral 50 indicates a bed of machine body 1, on which a work table 51 for mounting a workpiece W is mounted for sliding movement in a horizontal X-axis direction perpendicular to the plane of the Figure. A column 53 is mounted on bed 50 for sliding movement in a horizontal Z-axis direction orthogonal to the X-axis direction. Spindle head 10 is, in turn, mounted on column 53 for sliding movement in a vertical Y-axis direction. Work table 51 is drivingly connected to a servomotor 54 secured to bed 50 to be moved in the X-axis direction. Column 53 is drivingly connected to a servomotor 55 secured to bed 50 to be moved in the Z-axis direction. Spindle head 10 is drivingly connected to a servomotor 56 mounted on the top of column 53 to be moved in the Y-axis direction. Servomotors 54, 55 and 56 are connected to numerical control device 2 through a drive unit 5 to be rotated by distribution feed pulses generated from numerical control device 2.

Tool spindle 12 is drivingly connected to a drive motor 58 secured to spindle head 10 to be rotated thereby and adapted to receive the above-described tool holder 13 by means of the automatic tool change device (not shown). Drive motor 58 is controlled by a spindle motor control circuit 6 connected to numerical control device 2. A toroidal coil 60 is mounted on the front end of spindle head 10 and is connected to an AC power source 59 through a detection resistance R1. Coil 60 is wound around iron core which surrounds spindle 12.

When flange portion 23a of contact detecting head 23 is brought into contact with machined bore W1 of workpiece W, an induced current is produced in a looped circuit including workpiece W, work table 51, bed 50, column 53, spindle head 10, tool spindle 12, and tool holder 13, as shown in dotted lines in FIG. 3, whereby an exciting current in coil 60 is increased. This causes voltage across resistance R1 to be increased. Contact detecting circuit 3 detects the contact between workpiece W and contact detecting head 23 by detecting increased voltage across resistance R1. When detecting the contact, contact detecting circuit 3 generates a contact detecting signal TDS.

Numerical control device 2 is of a conventional construction and has a usual numerical control function in accordance with numerical control information, which is recorded on a punched tape 62 readable by a tape reader 61. Furthermore, numerical control device 2 serves to control movement of spindle head 10 in accordance with command signals output from a bore diameter measurement control device 4, which is described hereinafter. The numerical control information includes M-code data M90 to M92 for commanding a bore diameter measuring operation and B-code data for instructing a finished diameter of the bore W1 of the workpiece W. These code data are applied from numerical control device 2 to bore diameter measurement control device 4 in the course of the numerical control operation.

Bore diameter measurement control device 4 in this embodiment is constructed by a commercially available general purpose microcomputer which is programmed to control the bore diameter measuring operation by switching numerical control device 2 into a manual mode and applying an axis designation data and a pulse distribution command to numerical control device 2 in response to M-code data M90 to M92.

Figure 4:
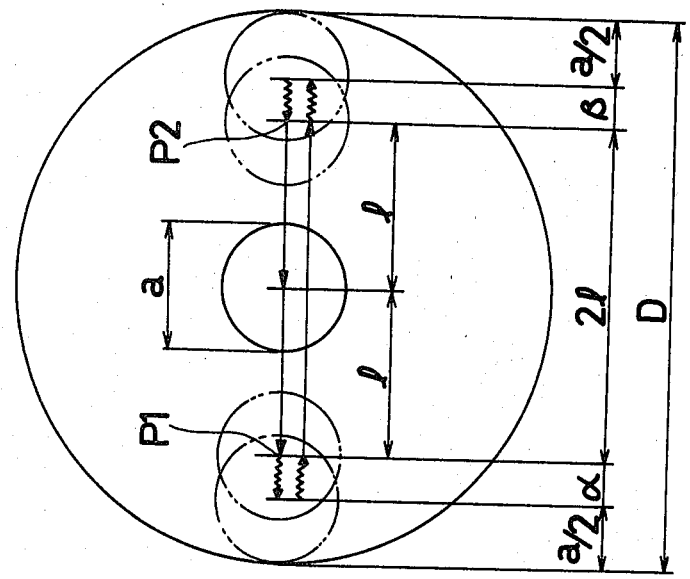
FIG. 4 is illustrative of a method of measuring the diameter of the machined bore.

The manner of measuring a diameter of the machined bore W1 on workpiece W is illustrated in FIG. 4. It is to be noted here that the machine tool according to the present invention has also a centering function to align tool spindle 12 with the center of a bore of the workpiece by utilizing contact detecting head 23 located at an axial position shown in phantom lines in FIG. 1 before boring operation is performed on the bore.

In order to measure the machined bore, contact detecting head 23 with known diameter a is moved at a rapid speed, for example, to the left as viewed in FIG. 4 by a distance l from the center of the machined bore to a point P1 in the vicinity of the internal surface of the machined bore. Contact detecting head 23 is then moved at a low speed still to the left until contact detecting circuit 3 detects the contact between contact detecting head 23 and the machined bore. A distance a between point P1 and a point where contact detecting head 23 contacts the machined bore is calculated by counting the number of feed pulses applied to the associated servomotor. Subsequently, contact detecting head 23 is moved to the right back to point P1 at the low speed and moved at the rapid speed by distance 2 l to a point P2 in the vicinity of the opposite internal surface of the machined bore. Detecting head 23 is then moved at such low speed further to the right until contact detecting circuit 3 detects the contact between the contact detecting head 23 and the opposite internal surface of the machined bore. A distance $\beta$ between point P2 and a point where contact detecting head 23 contacts the opposite internal surface of the machined bore is calculated. With the distances $\alpha$ and $\beta$ being calculated, diameter D of the machined bore is obtained from the following equation:

$$D = \alpha + \beta + 2 l + a$$

A tool position compensation amount $\epsilon$ can be calculated by obtaining a half of the difference between measured diameter D and a finish diameter Do preset in the B-code data.

Feed instructions to control the above-described feed movement are applied from bore diameter measurement control device 4 to numerical control device 2 to control the associated servomotor. The workpiece is first trial machined by the tool which is set to machine a bore with a diameter a little smaller than a finish bore diameter, and subsequently a diameter of the machined bore is measured so as to obtain a tool position compensation amount $\epsilon$. A number $\eta$ of spindle rotations for tool position compensation is obtained by division of the tool position compensation amount $\epsilon$ by a unit tool position compensation amount $\Delta\lambda$ per single spindle rotation.

With cylinder 41 being actuated to fix internal gear 37 relative to spindle head 10, spindle 12 is rotated through n revolutions in one direction, whereby the tool position is adjusted to a position corresponding to diameter Do of the finish bore. When the piston of cylinder 41 is retracted to release internal gear 37, a finish machine operation can be immediately initiated. Rotation of spindle 12 in the reverse direction enables tool position compensation in the opposite direction.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A machine tool for operation on a workpiece formed with a bore to be machined comprising:
   a machine body;
   a work table mounted on said machine body for mounting thereon said workpiece formed with a bore to be machined;
   a spindle head mounted on said machine body;
   a tool spindle rotatably supported in said spindle head;
   a motor drivingly connected to said tool spindle for rotating said tool spindle;
   a servomotor for effecting relative movement between said work table and said tool spindle;
   feed control means connected to said servomotor for controlling said servomotor in accordance with feed pulses and axis designation signals;
   a tool holder receivable in said tool spindle;
   a boring tool supported on said tool holder;
   means provided in said tool holder for adjusting the radial position of said boring tool by utilizing rotation of said tool spindle;

a contact detecting head with a predetermined diameter secured to said tool holder in co-axial relationship therewith;

means electrically connected to said contact detecting head for detecting contact between said workpiece and said contact detecting head;

bore diameter measuring means connected between said contact detecting means and said feed control means for applying feed pulses and axis designation signals to said feed control means so as to move said tool spindle relative to said workpiece from a first position to a second position wherein at each of said first and second positions said contact detecting head contacts said workpiece, along a path passing through the center of said workpiece bore, to thereby measure the diameter of said workpiece bore; and a motor control circuit connected to said motor for controlling said motor;

said motor control circuit being responsive to said measuring means for rotating said tool spindle to adjust the radial position of said boring tool.

2. A machine tool as set forth in claim 1, wherein said measuring means further comprises means for calculating the difference between a measured diameter of said workpiece bore and a predetermined command finish diameter, and wherein said motor control circuit further comprises means for rotating said tool spindle through revolutions corresponding to said difference.

3. A machine tool as set forth in claim 1, wherein said contact detecting means further comprises:

a resistance;

a coil connected to an electric power supply in series with said resistance and disposed around a front portion of said spindle head for causing induced current to flow through said workpiece, contact detecting head, tool spindle, spindle head, machine body and work table when contact is made between said workpiece and said contact detecting head; and a voltage detector connected to said resistance and said measuring means for detecting the change of voltage across said resistance when contact is made between said workpiece and said contact detecting head.

4. A machine tool as set forth in claim 1, 2 or 3, wherein said measuring means further comprises means for applying feed pulses and axis designation signals to said feed control means so as to move said tool spindle at a rapid speed through a predetermined distance from the center of said workpiece bore toward said first position and at a slow speed until said tool spindle is moved to said first position and then to move said tool spindle at the rapid speed through a distance twice said predetermined distance from said first position toward said second position and at the slow speed until said tool spindle is moved to said second position.

* * * * *